INVENTOR.
GILBERT YANISHEVSKY
BY
Vincent L. Carney
ATTORNEY

INVENTOR.
GILBERT YANISHEVSKY
BY
Vincent L. Carney
ATTORNEY

United States Patent Office 3,281,831

Patented Oct. 25, 1966

3,281,831

CHARACTER GENERATOR APPARATUS INCLUDING FUNCTION GENERATOR EMPLOYING MEMORY MATRIX

Gilbert Yanishevsky, Philadelphia, Pa., assignor to Burroughs Corporation, Detroit, Mich., a corporation of Michigan Filed July 2, 1964, Ser. No. 379,936
7 Claims. (Cl. 340—347)

This invention relates to information storage devices and more particularly, relates to a memory for use in character generators.

The use of large capacity digital computers as decision-making devices requires a means for displaying information to the operator of the computer rapidly and in a form which can be easily understood. One system for displaying such information presents a graphic symbol on a display screen to the operator, which symbol indicates the desired information. It is formed by a unit in the computer called a "character generator."

One type of character generator in which the storage device of this invention is useful receives information from the computer in the form of binary output words and selects a symbol in accordance with these binary output words for the presentation upon a cathode-ray-tube (CRT) screen. The symbol is selected from a memory containing a plurality of devices capable of generating the voltage functions necessary to cause the CRT to generate the desired symbols. This apparatus may be of the opaque mask type, the settable potentiometer type, or the diode matrix type of function generators among others. A character generator using the last mentioned type of memory is described in the application of Charles P. Halsted, Serial No. 277,796, entitled "Symbol Generating Apparatus," and assigned to the same assignee as the instant application.

In the character generator disclosed in the aforementioned Halsted application, the symbols are stored in the form of a plurality of straight lines each indicated by line length and a polar angle. A character generator moves the electron beam of the CRT in a series of straight lines to generate the symbol. Horizontal and vertical deflection voltages are provided to the CRT to cause the electron beam to sweep in the proper polar angle. The sweep of the electron beam is controlled for a period of time necessary to generate the proper length straight line.

In the above-mentioned character generator each symbol is stored in an addressable memory. When a particular character is selected for read out, the voltages for the succession of straight lines are read out in series to cause the CRT to generate the selected character at a fixed location and orientation upon the face of the CRT. Each character is stored with a diode matrix upon a separate card.

It is necessary to have a large number of cards for most uses of the character generator. Also when many diodes are necessary for the character, the speed obtainable by the character generator is not as large as is desired. Accordingly, it is an object of this invention to provide an improved memory.

It is a further object of this invention to provide an economical memory for a character generator, which memory permits rapid operation of the character generator.

It is a still further object of this invention to provide an inexpensive memory containing relatively few components for generating symbols in a character generator.

In accordance with the above objects, a memory matrix is provided having a plurality of vertical conductors and a plurality of horizontal conductors orthogonal to and in juxtaposition with the vertical conductors. Each vertical conductor corresponds to one line of a character formed by sequentially reading out each vertical line. The outputs taken from some of the horizontal lines determine the polar angle at which each line is to be drawn while the outputs from the others of the horizontal lines correspond to the length of each line segment. The vertical lines have voltages applied to them. These voltages are connected to selected horizontal conductors so as to form a pattern of outputs representing each line.

The horizontal and vertical conductors are connected to each other through current valves such as transistors. A shift register or similar counting device selects the vertical lines one at a time in sequence so as to effect the successive presentation of the line segments which together compose a character. The voltage pulse from a shift register is one of the two conditions necessary to cause the current valves to conduct so as to electrically connect a horizontal and a vertical line. The other conditions which cause the current valves to conduct is an enabling voltage applied to a control element. The current valves which are to be enabled in sequence by the shift register are chosen by a separate decoder which is capable of enabling many different patterns for many different symbols in response to corresponding input voltages. This pattern may be set for any one character before the shift register counts along the individual lines composing that character.

The invention and the above-noted and other features thereof will be understood more clearly and fully from the following detailed description considered with reference to the accompanying drawings in which.

Figure 1:
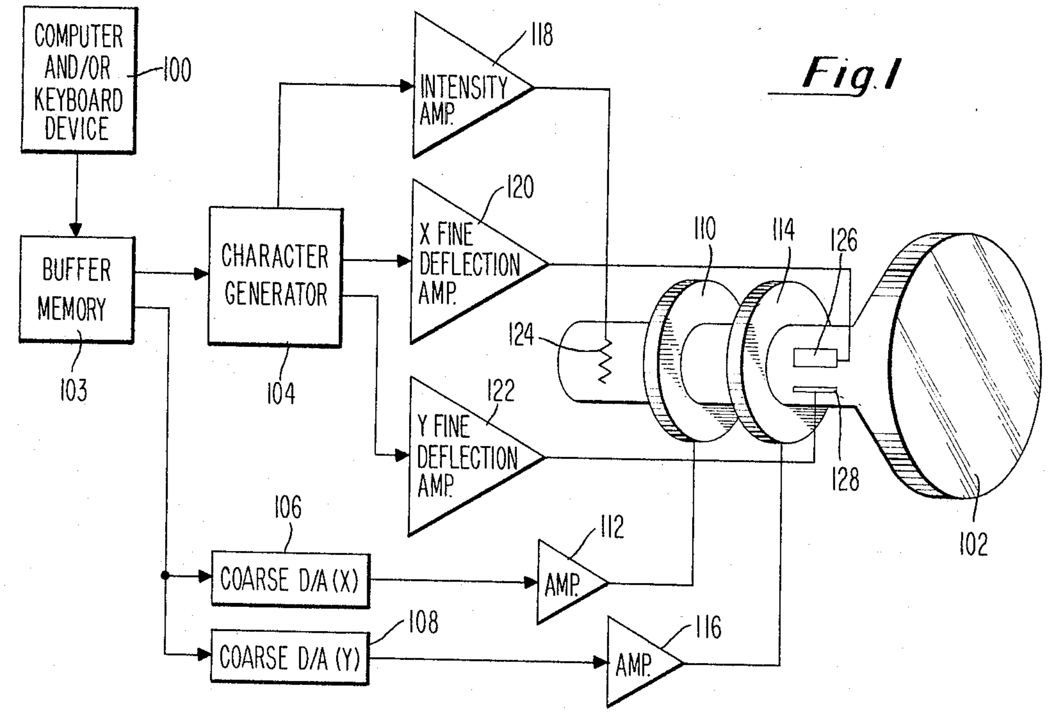
FIGURE 1 is a block diagram of a computer-display combination which may include an embodiment of the invention.

In FIGURE 1 a block diagram of a computer-display system that may include an embodiment of the invention is shown, having a computer or keyboard device 100 which selects the characters to be displayed on the CRT 102. The computer 100 sends digital informtion to the buffer memory 103, which stores such information as type of character, location of character, and size of character. A conventional drum or magnetic core memory may be used for the buffer memory 103. This memory merely keeps sending the same information to the character generator over and over until new information is to be displayed. In practice the entire display is reproduced forty times a second to eliminate visible flicker. The buffer memory 103 is electrically connected to the character generator 104, to the coarse digital-to-analog converter (coarse D/A–X) 106 and to the coarse digital-to-analog converter (D/A–Y) 108.

The coarse D/A–X 106 is electrically connected to the coarse vertical deflection plate 110 of the CRT 102 through the coarse deflection amplifier 112 and the coarse D/A–Y 108 is electrically connected to the horizontal coarse deflection plate 114 through the coarse deflection amplifier 116.

The information that determines character location is sent from the buffer memory 103 to the two coarse D/A converters 106 and 108 of the coarse deflection system. The coarse D/A–Y 108 determines the general vertical height (or line) upon which a character is to be displayed, while the coarse D/A–X 106 converter determines the general horizontal area (or place on the line) where the character is to be displayed.

The character generator 104 is electrically connected to the intensity amplifier 118, to the X fine-deflection amplifier 120, and to the Y fine-deflection amplifier 122. The intensity amplifier 118 is electrically connected to the electron gun 124; the X fine-deflection amplifier 120 is electrically connected to the fine vertical deflection plate 126 of the CRT 102; and the Y fine-deflection amplifier 122 is electrically connected to the horizontal fine-deflection plate 128.

The buffer member 103 sends the character selection information to the character generator 104. The character generator 104 sends analog information to the deflection amplifiers 120 and 122 to indicate the angle of the line segments that are to form the selected character. They cause the electron beam in the CRT 102 to trace straight lines across its face having the necessary polar angles to position the line segments which together compose the selected character. The character generator sends intensity information from a timing circuit through the intensity amplifier 118 to the electron gun 124. The character generator also determines the tracing time or limits the lines which together compose the selected character.

Both magnetic and electrostatic deflection of the cathode-ray-tube 102 are used in the system of FIGURE 1. The coarse deflection amplifiers 112 and 116 go to the magnetic deflection yokes 110 and 114. The fine-deflection amplifiers 120 and 122 go to the electrostatic vertical deflection plates 126 and the horizontal electrostatic deflection plates 128 respectively. The ratio of the distance of the vertical deflection to the distance of the horizontal deflection of a given stroke determines the slope of the line to be displayed.

It is not necessary to use both magnetic and electrostatic deflection to form the characters on the oscilloscope 102. The coarse and fine deflection information can easily be combined and used in either all-electrostatic or all-electromagnetic deflection systems. However, the character generation speed is reduced for all-electromagnetic deflection, since electrostatic deflection is faster in the present state of the art.

Figure 2:
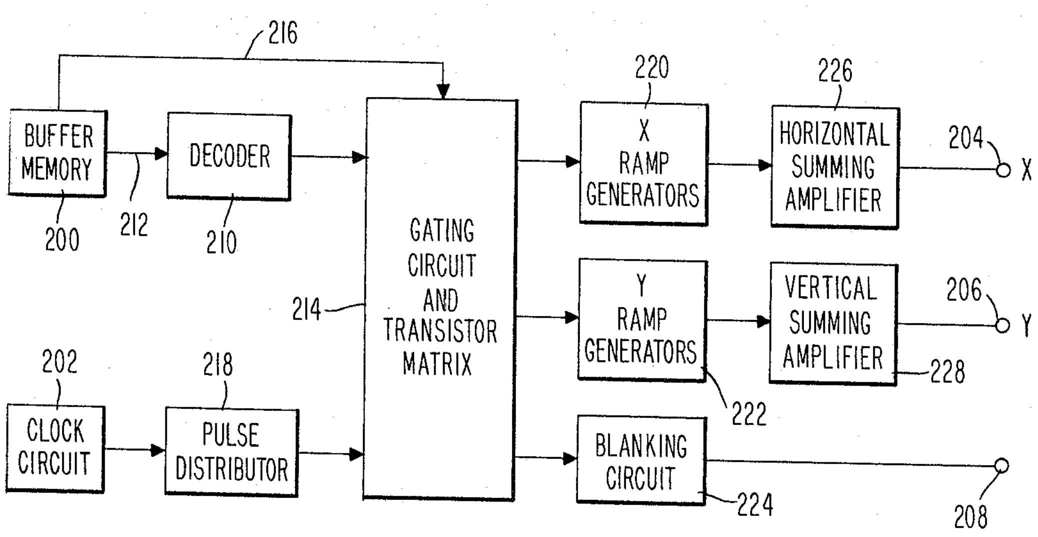
FIGURE 2 is a block diagram of a character generator which may include an embodiment of the invention.

In FIGURE 2 a block diagram of a character generator in which an embodiment of the invention may be used is shown having buffer momery 200, a clock circuit 202, a terminal 204 which is to be electrically connected to the horizontal deflection for the CRT, a terminal 206 which is to be electrically connected to the vertical deflection amplifier of the CRT, and a terminal 208 which is to be electrically connected to the blanking amplifier for the CRT. The buffer memory 200 is electrically connected to the decoder 210 through the line 212 and to the gating circuit and transistor matrix 214 through the line 216. The clock circuit 202 is electrically connected to the pulse distributor 218.

The gating circuit and transistor matrix 214 receives inputs from the decoder 210 and from the pulse distributor 218, and provides outputs to the X ramp generators 220, to the Y ramp generators 222, and to the blanking circuit 224. The X ramp generators 220 provide an output to terminal 204 through the horizontal summing amplifiers 226; the Y ramp generators 222 provide an output to terminal 206 through the vertical summing amplifier 228; and the blanking circuit 224 provides an output to terminal 208.

The buffer memory 200 sends information to the decoder 210 to select a particular character that is to be displayed. Once the particular character has been selected, the pulse distributor 218 causes each line forming the character to be read out in sequence as synchronized by the clock circuit 202. Each line is read out in the form of pulses on a plurality of output lines determining the polar angle of the line and the time that the line is to be drawn on the CRT at a constant velocity, resulting in the proper line length. The polar angle information determines the rate of change of the voltages provided to terminals 204 and 206 by the ramp generators and summing amplifiers.

Figure 3:
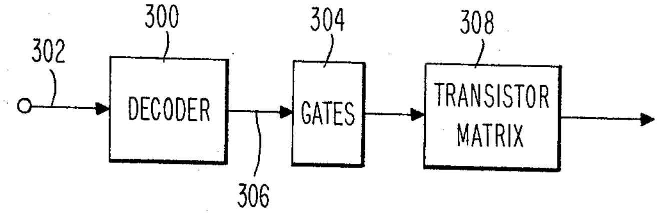
FIGURE 3 is a block diagram showing the arrangement of the main elements in the memory which is an embodiment of the invention.

In FIGURE 3, a block diagram of the character generator memory is shown, having a decoder 300 which receives a digital signal on a plurality of lines indicated as 302 from the buffer memory and in turn sends voltages to a plurality of OR gates 304 through another group of lines represented as 306. The gates 304 control the character which is to be read out by applying activating pulses to the transistors in the transistor matrix 308. These enabling pulses prepare the transistors for making a connection between the vertical and horizontal lines of the matrix so that as a pulse distributor selects a line several of the horizontal lines are activated to indicate a polar angle and a line length. Individual characters, then, are stored in the memory in the form of the connections between the outputs of the decoder 300 and the inputs to the OR gates 304. Each character is controlled by a different pattern of activated transistors and each transistor is controlled by an OR gate from the array of OR gates indicated as 304 in FIGURE 3.

Figure 4:
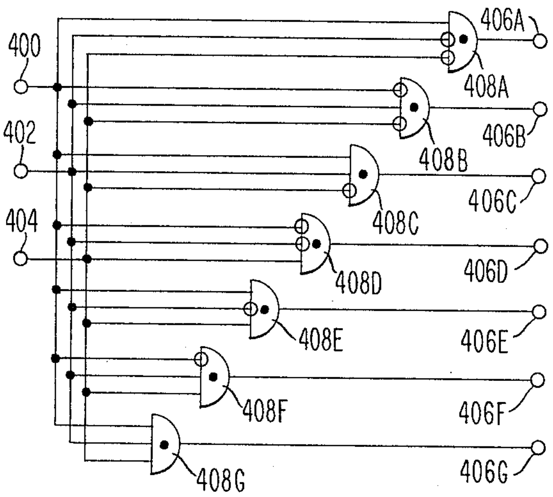
FIGURE 4 is a logical circuit diagram showing one simple form of the decoder.

In FIGURE 4 a logic diagram of a simple decoder which may be used in an embodiment of this invention is shown having three inputs 400, 402 and 404 respectively, for receiving a three-bit binary word from the buffer memory 103 (shown in FIGURE 1) to indicate the selected character. Seven outputs 406A–406G from the decoder are electrically connected to the OR gates indicated as 304 in FIGURE 3. Each of the seven output terminals 406A–406G is electrically connected to the output of a corresponding one of the seven AND gates 408A–408G.

Each of the inputs 400, 402 and 404 are electrically connected to each of the seven AND gates 408A–408G. The logic circuit diagram of FIGURES 4 converts the three-bit binary input into a seven bit reflected code output, in a conventional manner. The terminal 400 is adapted to receive a $2^0$ bit; the terminal 402 is adapted to receive the $2^1$ bit; and the terminal 404 is adapted to receive the $2^2$ bit.

Accordingly, the gate 408A is inhibited by inputs from terminals 402 and 404 and is enabled by an input from terminal 400; the gate 408B is inhibited by inputs from terminals 400 and 404 and is enabled by an input from terminal 402; the gate 408C is enabled by inputs from terminals 400 and 402 and inhibited by inputs from terminal 404; gate 408D is enabled by inputs from terminal 404 and inhibited by inputs from terminals 400 and 402; gate 408E is enabled by inputs from terminals 400 and 404 and inhibited by an input from terminal 402; gate 408F is enabled by inputs from terminals 402 and 404 and inhibited by an input from terminal 400; and gate 408G is enabled by inputs from terminals 400, 402 and 404.

The decoder of FIGURE 4 is provided as an example. However, many other decoders may be used. In a practical embodiment a much larger decoder would be used such as one receiving a seven bit binary input word and providing a possible 128 outputs.

Figure 5:
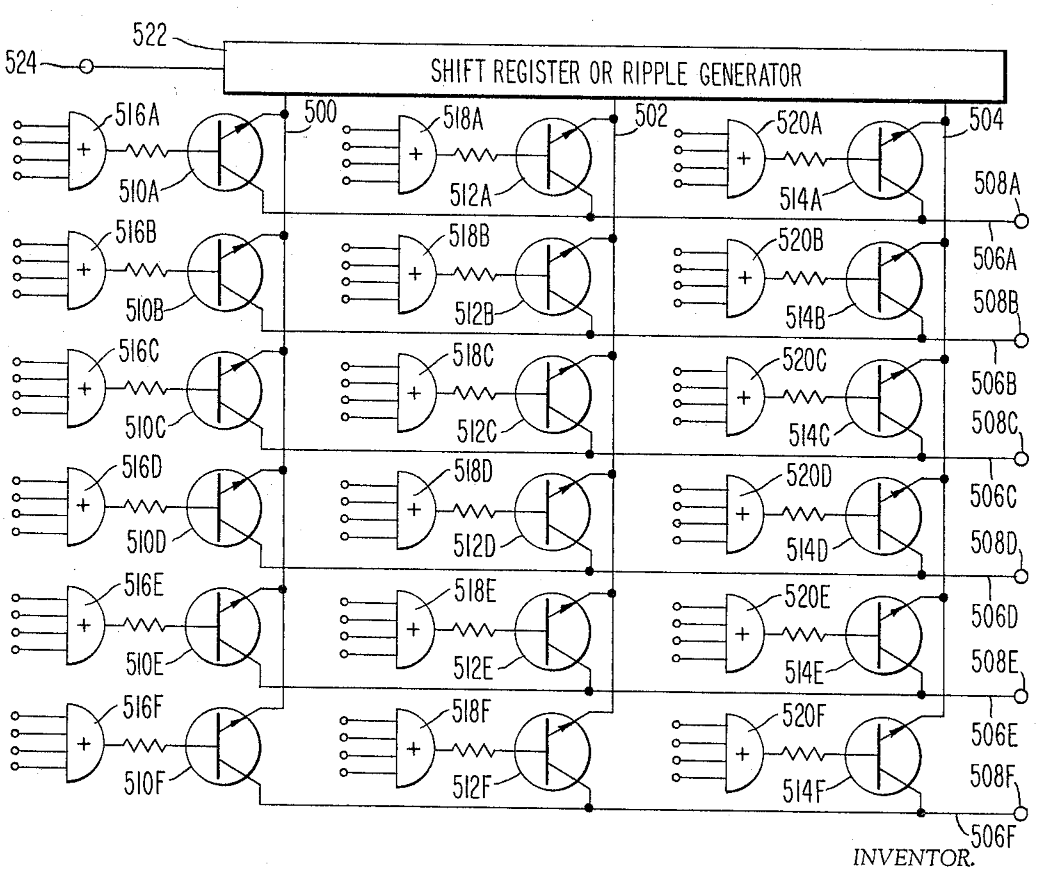
FIGURE 5 is a simplified schematic circuit diagram showing the arrangement of the gates and transistor matrix which may be utilized in one embodiment of the invention.

In FIGURE 5 a simplified schematic circuit diagram of the gates designated as 304 and of the transistor matrix designated as 308 in FIGURE 3 is shown. The transistor matrix in FIGURE 5 has three vertical conductors 500, 502 and 504. Each of these three veritcal conductors corresponds to one of three lines making up any character. The matrix also has six horizontal conductors 506A–506F. Each of the six output terminals 508A–508F is electrically connected to a corresponding one of the horizontal conductors 506A–506F.

The output terminals 508A–508F represent the various outputs necessary to define one line with a polar angle and line length as explained in the above-identified application to Halsted. For example, the output terminals 508A, 508B may select one of two values of X deflection voltage on the CRT shown as 102 in FIGURE 1; the output terminals 508C and 508D might select one of two values of Y deflection voltage for the CRT 102; and the output terminal 508E and 508F might select one of two sweep-times for the cathode-ray-tube 102 so as to define line length. Other horizontal lines may also be used such as those which would indicate the end of a character.

Each of the horizontal lines 506A–506F is capable of being electrically connected to the vertical conductors 500, 502 and 504 so as to conduct energy from the vertical conductors to the output terminals 508A–508F. This connection is made through transistors used as gates. Each of the six NPN transistors 510A–510F has its emitter electrically connected to the vertical conductors 500 and has its collector electrically connected to a corresponding one of the six horizontal conductors 506A–506F; each of the six NPN transistors 512A–512F has its emitter electrically connected to the vertical conductor 502 and has its collector electrically connected to a corresponding one of the six horizontal conductors 506A–506F; and each of the six NPN transistors 514A–514F has its emitter electrically connected to the vertical conductors 504 and has its collector electrically connected to a corresponding one of the six horizontal conductors 506A–506F.

The base of each of the six transistors 510A–510F is electrically connected through a different resistor to the output of a corresponding one of the six OR gates 516A–516F; the base of each of the six transistors 512A–512F is electrically connected through a different resistor to the output of a corresponding one of the six OR gates 518A–518F; and the base of each of the six transistors 514A–514F is electrically connected through a different resistor to the output of a corresponding one of the six OR gates 520A–520F.

Each of the OR gates 516A–516F, 518A–518F and 520A–520F is shown having four input terminals which may be electrically connected to the output terminals 406A–406G of the decoder shown in FIGURE 4. In this way the outputs from the decoder of FIGURE 4 may activate selective ones of the transistors to electrically connect the horizontal lines in the output terminals of the matrix to the vertical lines. A shift register 522 successively energizes the vertical lines 500, 502 and 504 in response to clock pulses applied to terminal 524 by the clock circuit indicated as 202 in FIGURE 2. Accordingly, selected transistors are preconditioned (biased) through OR gates by the decoder of FIGURE 4 to indicate the three lines of a character which is to be read out and then the vertical lines 500, 502 and 504 are successively activated so as to cause the three lines to be presented on the CRT in succession forming a display of the selected character.

It can be seen that any of the desired polar angles and line lengths may be obtained in response to a given binary input into the decoder of FIGURE 4 by electrically connecting the output terminal of the terminals 406A–406G which is activated in response to this input to one of the four inputs to the appropriate ones of the OR gates 516A–516F, 518A–518F and 520A–520F.

For example, a line which is to be presented on the CRT in response to a bit on terminal 400 and no bit on terminals 402 and 404 is selected because the output terminal 406A is electrically connected to three of six possible OR gates. The output terminal 406A is connected to either of the OR gates 516A or 516B to select the X deflection voltage of the line; it is connected to either of the OR gates 516C or 516D to select the Y deflection voltage of the line; and, it is connected to either of the OR gates 516E or 516F to determine the length of the line. It is also connected to three of the six OR gates 518A–518F to determine the second line and to three of the input terminals of the six OR gates 520A–520F to determine the third line in a similar manner. The lines are read out in succession by the shift register 522.

Figure 6:
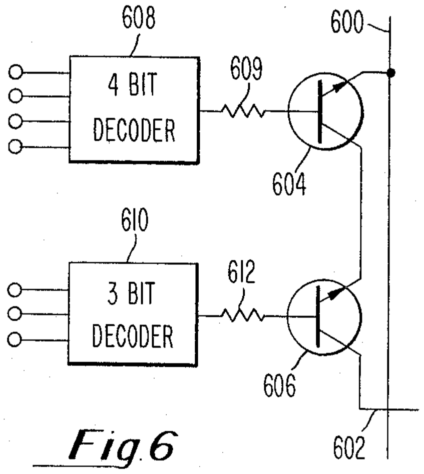
FIGURE 6 is a schematic circuit diagram showing another form of the decoder which is utilized in an embodiment of the invention.

In FIGURE 6 a schematic circuit diagram is provided of an alternate system for electrically connecting the vertical and horizontal lines of the matrix shown in FIGURE 5. A vertical conductor 600 is shown connected by two transistor gates in series to a horizontal conductor 602. The conductor 600 is electrically connected to the emitter of the NPN transistor 604; the collector of the transistor 604 is electrically connected to the emitter of another NPN transistor 606; and the collector of the transistor 606 is electrically connected to the horizontal conductor 602. The base of the transistor 604 is electrically connected to the output of a four-bit decoder 608 through the resistor 609 while the base of the transistor 606 is electrically connected to the output of a three-bit decoder 610 through the resistor 612.

A connection of this type makes possible the selection of 128 types of characters with a seven-bit input while utilizing fewer components that would be necessary with only one transistor connected to each vertical and horizontal line and a seven-bit decoder. In this system the two series transistors 604 and 606 replace an AND gate of the decoder and result in an overall economy of operation.

The diodes used in the decoders of either the embodiment of FIGURE 5 or the embodiment of FIGURE 6 may be slow and relatively inexpensive. The transistors may be of the type 2N706 which are very fast. This may be done since the transistors are set by the decoder ahead of time in a relatively slow manner and then the read out is rapid through the shift register 522.

In a typical application of 128 types of characters, three thousand diodes and anywhere from 100 to 200 transistors may be required, depending on the degree of character font required. This provides an advantage of reduced cost and higher speed over the use of a memory matrices composed entirely of diodes to form the memory for the character generator.

The connections between the diode decoder and the transistor matrix of this embodiment replace individual diode cards necessary in diode matrix type of memories resulting in the simplification of the memory. It also results in higher speed since the transistors are faster than diodes. A ripple generator may be used instead of the shift register 522 if a constant shift rate is desired in all applications.

Obviously, many modifications and variations of the invention are possible in the light of the above teachings. It is therefore to be understood that within the scope of the appended claims the invention may be practiced otherwise than as specifically described.

What is claimed is:

1. In a character generator including display means in which sequential control words are utilized in the line-by-line generation and display of character or symbol representations, a memory for providing a predetermined sequence of output words, each word of which is composed of a plurality of parallel bits, on selected ones of a plurality of memory output terminals, each being connected to said display means, in response to an input selection code comprising:

a shift register having an input terminal electrically connected to a clock pulse generator and having a plurality of output terminals;

a first plurality of conductors each conductor of which is electrically connected to a different one of the output terminals of said shift register;

a second plurality of conductors each being electrically connected to a different one of said memory output terminals;

a plurality of gates;

each conductor of said first plurality of conductors being electrically connected to each conductor of said second plurality of conductors through a different one of said gates;

each of said gates having an input circuit means for causing said gate to conduct in response to a signal and being connected to receive said signals through any of a plurality of connections; and decoding means for converting said selection code to another code indicated by an output signal on an output terminal thereof for each word;

the output terminals of said decoding means being electrically connected to said input circuit means whereby each word of said selection code opens selected ones of the gates connecting said first plurality of conductors to said second plurality of conductors and permits predetermined output words to be read from said second plurality of conductors in a timed succession as the shift register is shifted to successively energize each of the first plurality of conductors.

2. A memory for providing a predetermined sequence of output words, each word of which is composed of a plurality of parallel bits, on selected ones of a plurality of memory output terminals in response to an input selection code, according to claim 1 in which each of said input circuit means comprises an OR gate having an output terminal electrically connected to different ones of said gates and having a plurality of input terminals connected to different ones of the output terminals of said decoding means.

3. A memory for providing a predetermined sequence of output words, each word of which is composed of a plurality of parallel bits, on selected ones of a plurality of memory output terminals in response to an input selection code, according to claim 2 in which each of said gates comprises a transistor having a base electrode electrically connected to the output terminal of a different one of said OR gates and having one of its remaining electrodes electrically connected to a different one of said first plurality of conductors and having another of its electrodes connected to a different conductor of said plurality of second conductors.

4. In a character generator of the type in which a character is selected from a memory by a binary selection word and in which said memory provides a series of words in parallel bit form indicating the angle and length of the lines of said selected character to control circuitry that generates cathode-ray-tube deflection voltages and trace-line times to cause said character to be drawn in the form of a series of lines at a constant velocity on the face of said cathode-ray-tube, an improved memory comprising:

a shift register;

said shift register having an input terminal connected to a clock pulse generator and a plurality of output terminals for successively providing output pulses;

a first plurality of conductors electrically connected to the outputs of said shift register, whereby said first plurality of conductors is energized successively in synchronism with clock pulses from said clock pulse generator;

a second plurality of conductors;

a plurality of output terminals each electrically connected to a different one of said second plurality of conductors;

a plurality of NPN transistors electrically connecting each conductor of said first plurality of conductors to each conductor of said second plurality of conductors;

each of said NPN transistors having a collector electrically connected to one conductor of said second plurality of conductors and an emitter electrically connected to one conductor of said first plurality of conductors;

a plurality of OR gates;

the output of each OR gate of said plurality of OR gates being electrically connected to a base electrode of a different one of said plurality of NPN transistors;

a code translator having a plurality of output terminals and being connected to receive said binary selection words;

the output terminals of said code translator being electrically connected to input terminals of selected ones of said or OR gates, whereby the binary selection word applied to the code translator causes conduction of selected transistors such that said output terminals electrically connected to said second plurality of conductors are energized by said first plurality of conductors as said shift register is shifted to provide a succession of parallel-bit binary word outputs in accordance with code translation of said selection words and the connection between said code translator and said plurality of OR gates.

5. In character generation apparatus including display means for the line-by-line generation and display of characters or symbols, a function generator comprising:

a plurality of conductors;

distributor means having a plurality of output terminals each electrically connected to a different one of said plurality of conductors for energizing said conductors successively;

a memory matrix having connected to each of said plurality of conductors a first set of gates corresponding to at least one point of origin for character or symbol component lines in a character matrix and a second set of gates corresponding to a plurality of different component line lengths, each of said gates having an output terminal connected to said display means and a control terminal; and selection signal receiving and decoding means electrically connected to said gate control terminals for causing selected ones of said gates to conduct in response to selection signals, whereby time-sequenced sets of character or symbol line describing signals may be provided on selected ones of said gate output terminals.

6. In character generation apparatus including display means for the line-by-line generation and display of characters or symbols, the function generator of claim 5 wherein the memory matrix includes a third set of gates connected to each of said plurality of conductors, the gates of which correspond to a plurality of polar angles at which character or symbol lines may be oriented at the point of origin thereof.

7. In character generation apparatus including display means for the line-by-line generation and display of characters or symbols, the function generator of claim 5 in which each of said first sets of gates includes a plurality of gates corresponding to a plurality of coordinates for the point of origin of character or symbol-forming lines.

References Cited by the Examiner

UNITED STATES PATENTS

| | | | |
|---|---|---|---|
| 2,627,039 | 1/1953 | MacWilliams | 340—166 |
| 3,140,473 | 7/1964 | Gaffney | 340—166 X |

ARTHUR GAUSS, *Primary Examiner.*

J. ZAZWORSKY, *Assistant Examiner.*